(12) United States Patent
Steele (10) Patent No.: US 9,657,926 B2
(45) Date of Patent: May 23, 2017

(54) DEVICE LEVELING ELEMENTS (71) Applicant: Diane Michelle Steele, Gaithersburg, MD (US)

(72) Inventor: Diane Michelle Steele, Gaithersburg, MD (US)

(*) Notice: Subject to any disclaimer, the term of this patent is extended or adjusted under 35 U.S.C. 154(b) by 90 days.

(21) Appl. No.: 14/719,108

(22) Filed: May 21, 2015

(65) Prior Publication Data

US 2015/0252989 A1 Sep. 10, 2015

Related U.S. Application Data

(62) Division of application No. 13/769,041, filed on Feb. 15, 2013, now Pat. No. 9,080,751.

(51) Int. Cl.
| | |
|---|---|
| F21V 21/00 | (2006.01) |
| F21V 21/08 | (2006.01) |
| F21L 4/00 | (2006.01) |
| F21S 9/03 | (2006.01) |
| F21V 21/06 | (2006.01) |
| F21V 21/12 | (2006.01) |
| F21V 21/14 | (2006.01) |
| F21V 21/30 | (2006.01) |
| F21S 6/00 | (2006.01) |
| F21S 8/08 | (2006.01) |
| F21W 131/109 | (2006.01) |
| F21W 131/10 | (2006.01) |
| F21Y 115/10 | (2016.01) |

(52) U.S. Cl.
CPC ............ *F21V 21/0824* (2013.01); *F21L 4/00* (2013.01); *F21S 9/037* (2013.01); *F21V 21/00* (2013.01); *F21V 21/06* (2013.01); *F21V 21/12* (2013.01); *F21V 21/145* (2013.01); *F21V 21/30* (2013.01); *F21S 6/005* (2013.01); *F21S 8/081* (2013.01); *F21W 2131/10* (2013.01); *F21W 2131/109* (2013.01); *F21Y 2115/10* (2016.08); *Y02B 20/72* (2013.01)

(58) Field of Classification Search
CPC .... F21V 21/0824; F21V 21/145; F21V 21/30; F21V 21/06; F21V 21/00; F21V 21/12; F21L 4/00; F21S 9/037; F21S 6/005; F21S 8/081; F21W 2131/10; F21W 2131/109; F21Y 2101/00
USPC ............ 248/188.2, 188.4, 188.6, 188.8, 677
See application file for complete search history.

(56) References Cited

U.S. PATENT DOCUMENTS

| | | |
|---|---|---|
| 587,489 A | 8/1897 | Heusser |
| 1,104,891 A | 7/1914 | Stansbury |
| 2,838,353 A | 6/1958 | Emmert |
| 2,931,463 A | 4/1960 | Stansbury |
| 3,396,928 A | 8/1968 | Lay |

(Continued)

*Primary Examiner* — Anita M King (57) ABSTRACT

A utilitarian device such as a weighted base includes a plurality of removable, folding, joinable, and adjustable leveling elements that attach along the underside surface of the base to form a tripod support. The leveling elements include interchangeable folding feet and pointed members each having threaded connections to the base individually or in series, to maintain a level orientation of the base over most surfaces. A plurality of storage clips retain and stow un-deployed leveling elements within the gap provided between the base and the ground surface. An upstanding pole attaches to the base upperside and supports an object such as a flag, umbrella, or other piece of equipment.

22 Claims, 7 Drawing Sheets

(56) References Cited

U.S. PATENT DOCUMENTS

| | | | |
|---|---|---|---|
| 3,415,475 A | | 12/1968 | Goodman |
| 4,826,448 A | * | 5/1989 | Maddock ............... F21V 21/002 |
| | | | 439/409 |
| 4,907,770 A | | 3/1990 | Marchetti |
| 4,934,639 A | | 6/1990 | Domenig |
| 5,062,028 A | * | 10/1991 | Frost ....................... F21S 8/081 |
| | | | 136/291 |
| 5,155,668 A | | 10/1992 | Tanner |
| 5,398,180 A | * | 3/1995 | Lee ......................... F21S 8/081 |
| | | | 362/152 |
| 5,630,660 A | | 5/1997 | Chen |
| 5,655,829 A | * | 8/1997 | Lin .......................... F21V 21/02 |
| | | | 362/145 |
| 5,680,033 A | | 10/1997 | Cha |
| 6,082,877 A | | 7/2000 | Hughes |
| 6,123,300 A | | 9/2000 | Chen |
| 6,216,713 B1 | * | 4/2001 | Kennan .................... A45B 9/04 |
| | | | 135/77 |
| 6,406,163 B1 | | 6/2002 | Yang |
| D464,156 S | | 10/2002 | Yeh |
| 6,520,459 B2 | * | 2/2003 | Burr ......................... F16M 7/00 |
| | | | 248/188.2 |
| 6,910,666 B2 | * | 6/2005 | Burr ......................... F16M 7/00 |
| | | | 248/188.2 |
| 6,935,463 B2 | * | 8/2005 | Brewster .................. E06C 7/46 |
| | | | 182/200 |
| 7,196,477 B2 | | 3/2007 | Richmond |
| 7,484,700 B2 | * | 2/2009 | Selle ....................... A47B 91/024 |
| | | | 248/188.4 |
| 2001/0019096 A1 | * | 9/2001 | Andreoli ................. F16M 7/00 |
| | | | 248/188.8 |
| 2003/0137831 A1 | | 7/2003 | Lin |

\* cited by examiner

DEVICE LEVELING ELEMENTS

CROSS REFERENCE TO RELATED APPLICATION

This U.S. Patent Application is a Division of Continuation-in-Part U.S. patent application Ser. No. 13/769,041 filed on Feb. 15, 2013, entitled, "Outdoor Solar Lamp with a Base having Flat and Pointed Foot Elements," now pending. Each patent application identified above is incorporated here by reference in its entirety to provide continuity of disclosure.

BACKGROUND OF THE INVENTION

Field of the Invention

The present invention relates generally to outdoor solar powered lamps and specifically to an outdoor solar powered floor lamp with a weighted base, folding feet, and pointed ridges joined adjustably and interchangeably to the underside surface of the base for leveling and stability purposes when placed on hard, soft, even, uneven, uniform, and non-uniform support surfaces.

Traditionally, outdoor lamps derive their upright support from a singular pointed base member such as a long finned spike that, when pushed into penetrable soil or a soft ground substrate, provides the necessary vertical support required for the lamp to remain upright. These lamps are capable of standing upright on even, uneven, level, or sloping surfaces; however, these ground penetrating lamps cannot be used on hard surfaces such as patios, decks, balconies, within gazebos, on concrete surfaces, on rough-cut stone, or on other hard surfaces where the use of an outdoor lamp might be useful and desired.

Accordingly there is a need for a stable stand-alone, vertically and gravitationally centered, outdoor solar floor lamp structure that can be used on flat or sloping, soft or hard, smooth or rough-cut surfaces, and combinations thereof, while vertically supporting a lamp thereabove. A traditional lamp base connected to an upstanding pole and lamp would suffice for use on hardened surfaces; however, traditional lamp bases are flat-bottomed and in outdoor applications could tilt unsteadily or damage the surface upon which they rest. Most lamp bases provide no means of accommodating the uneven or non-uniform surfaces upon which they are placed, while still providing the ability to level the lamp pole and the base independent of the given support surface. Surfaces upon which an outdoor lamp may be deployed include rough-cut stone, outdoor decks, concrete surfaces, and softer surfaces such as grass, mulch, and soil that may or may not be sloped. A further consideration lacking in most available floor lamp bases is the build-up of dirt, moisture and subsequent mold buildup beneath an otherwise flat lamp base support. Due the lack of air and trapped moisture, the support surface can become stained, develop mold, house pests, or kill underlying grass upon which it is placed.

To solve these problems, the present invention is provided having a modular and adjustable base that can be offset from its support surface to remain level, and further to provide an air gap between the support surface and the base for eliminating concerns of damaging the support surfaces. Specifically, a plurality of downward protruding folding feet and pointed ridges joined to the underside of the base serve to create a tripod support therefore that can each be adjusted vertically and interchanged or jointed with one another. The use of flat folding feet is ideal for hardened surfaces, while the pointed ridges are ideal for placement over soft soil or within surface gaps to maintain the base positioning during deployment.

Most traditional flat-bottomed lamp bases or those with feet are not suited for use over uneven or inclined surfaces or soft surfaces, since they lack adjustability and the modularity to account for different surface types while maintain a level orientation. Therefore it is desirable to disclose a stand-alone outdoor solar floor lamp with a base that is constructed specifically such that the its leveling elements provide a user with the flexibility to deploy the lamp in a wide variety of differing outdoor environments while maintaining the upright and level position of the base and upstanding lamp. The leveling elements are chosen specifically for the intended environment and specific area of deployment, while un-utilized leveling elements can be conveniently stored under the base for use if the lamp is moved and they are otherwise required. The present base, furthermore, is useful on soft and hard surface types, where the height-adjustable leveling elements are interchangeable with one another. Pointed ridges and generally flat folding feet are chosen to provide the necessary traction and interaction with the support surface required in the given environment. The height of the base can be adjusted to provide both a level orientation and air movement thereunder, minimizing base-to-surface contact on both hard and soft surfaces, and maximizing leveling, balancing, and traction properties with the given environment

DESCRIPTION OF THE PRIOR ART

Devices have been disclosed in the prior art that relate to floor lamps and outdoor solar lamps. These include devices that have been patented and published in patent application publications, and generally relate to tripod devices and solar lamps having particular elements that diverge from the present invention. The following is a list of devices deemed most relevant to the present disclosure, which are herein described for the purposes of highlighting and differentiating the unique aspects of the present invention, and further highlighting the drawbacks existing in the prior art.

U.S. Design Pat. No. D464156 to Yeh provides a self-contained fuel powered lamp having a spike base unit for securing the lamp by penetrating into a soft support surface. While disclosing a novel lamp design, the Yeh device is typical of most outdoor torches and lamps that require a soft ground surface to secure the lamp post. The present invention provides a new and improved outdoor lamp post support system that can support itself on most outdoor surfaces, including hardened surfaces, soft soil surfaces, and uneven and non-uniform surfaces. The present invention provides a structure that can be conveniently adapted to vertically and levelly support its lamp upper with minimal restrictions as to the support surface and without causing damage thereto.

U.S. Pat. No. 5,630,660 to Chen discloses a warning light having a telescoping post connected to a plurality of legs movable from a base structure. The movable legs form a tripod that can be used to level the post for upright support of the warning light thereabove when deployed. When not being used, the device can be condensed into a stowed state, whereby the post is telescopically collapsed onto itself and the legs are positioned in an upright position with respect to the base to reduce the assembly overall volume between uses. While disclosing a solar light support, the elements of the Chen device do not disclose the novel aspects of the weighted base and the adjustable and interchangeable leveling elements of the present invention.

U.S. Pat. No. 3,415,475 to Goodman discloses a non-metallic, weighted base for a light source that comprises a disk-like structure having an interior cavity filled with a dense material. The base includes a flat underside surface and an upper surface recessed region to accept a lamp post therein. The flat underside further includes a plurality of feet to support the base above the ground. No means of adjusting the feet is disclosed in the Goodman device. By contrast, the present invention provides a weighted base having a plurality of interchangeable and adjustable leveling elements that allow the base height and orientation to be adjusted, while also providing clearance for storage of any stowed folding feet not currently in use.

Finally, U.S. Pat. No. 5,155,668 to Tanner discloses a solar powered lamp that utilizes cold cathode fluorescent bulbs for increased illumination and enhanced lamp life. The device includes photovoltaic cells coupled to an electrical storage device that provides low voltage direct current. The low voltage direct current is transformed into higher voltage alternating current for use with a cold cathode fluorescent bulb in the absence of ambient light. The Tanner device is a combination fluorescent bulb light source and photovoltaic cells that allows prolonged lamp life and use during low light hours. The present invention pertains to an adjustable lamp base that is particularly suited for vertically and supporting a solar powered light source, whereby the light source can be positioned outdoors and on uneven surfaces and remain gravitationally centered and level.

It is submitted that the present invention is divergent in design elements from the prior art, and consequently it is clear that there is a need in the art for an improvement to existing lamp bases to include hard and soft surface stability, gravitationally centered leveling abilities, and convenient parts storage means. In this regard the instant invention substantially fulfills these needs.

SUMMARY OF THE INVENTION

It is the object of the present invention to provide a functional solar powered outdoor floor lamp that is specifically designed to be positioned in a gravitationally centered manner when used on hard or soft, flat or sloping, even or uneven, smooth or rough-cut surface areas and that will provide for air space between the bottom of the base and the top of the surface on which it sits.

The above object may be achieved in its simplest form by providing a weighted base having a plurality of interchangeable, height-adjustable, easily storable, folding feet and interchangeable, height-adjustable, easily storable, pointed ridges attached to and along the undermost side of the base. Above the base is provided an elongated pole, formed by at least one pole member or a plurality of segments thereof, which supports a solar powered lamp.

Another object is to provide an outdoor solar floor lamp that extends the utility of the otherwise standard ground spike-based outdoor fuel and solar lamps that are only useable on soft surfaces.

A further object of the present invention is to provide a new and novel floor lamp base having a leveling capacity that is provided via a plurality of interchangeable adjustable and foldable feet that are used or conveniently stored on the underside surface of the base. The folding feet and pointed ridges can be interchangeably used, jointly used, or stored to support the base on hard, soft, flat, sloping or combination surfaces to prevent deviation of the lamp base or lamp pole from a gravitationally centered orientation.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the outdoor solar floor lamp. For the purposes of presenting a brief and clear description of the present invention, the preferred embodiment will be discussed as used for providing the user with an outdoor lamp base having leveling capabilities, an ability to be deployed on surfaces of varying hardness and design, and convenient storage capacity for parts not in use. The present invention is ideally suited for use with a solar powered lamp having an ambient light sensor, whereby the lamp requires no external power source and can automatically activate during low light conditions. The figures are intended for representative purposes only and should not be considered to be limiting in any respect.

Figure 1:
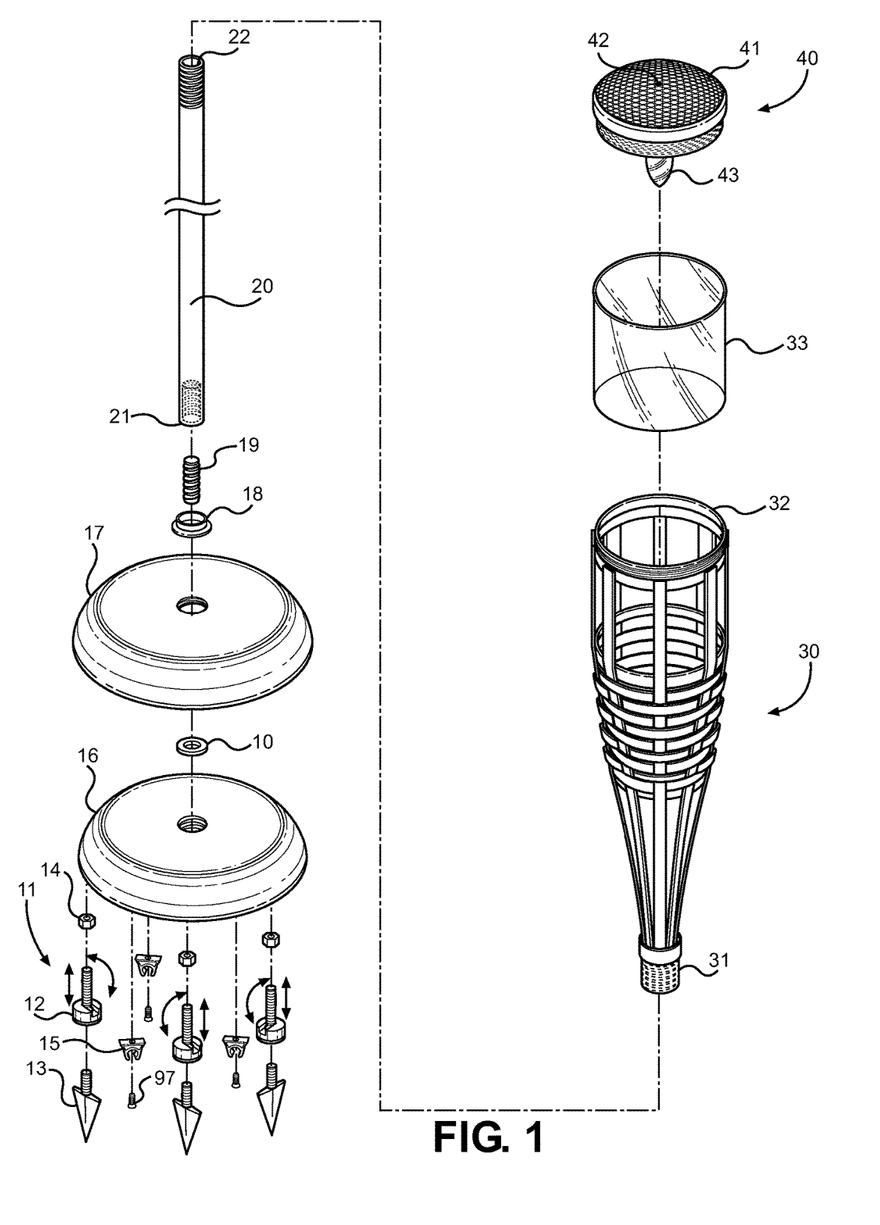
FIG. 1 shows an exploded perspective view of the present invention.

Referring now to FIG. 1, there is shown an exploded view of the elements of the present invention, including the base 16, leveling elements 11, a lamp pole 20, a decorative lamp housing 30, an ambient light sensor 42, and solar energy collection device 41 powering a light source 43. The leveling elements include a plurality of folding feet 12 and a plurality of pointed ridges 13 that work interchangeably or in conjunction with one another to form a three legged support for the base 16 that are threadably attached thereto. In the preferred embodiment, the leveling elements include three folding feet 12 and three pointed ridges 13 that can be simultaneously utilized to support the base or utilized in some combination thereof to provide three points of support therefor. Those leveling elements not being used to support the base are stowed along the underside of the base 16 using threadably attached storage clips 15, which secure the threaded ends of the leveling elements 11 and retain them against the base underside surface. Clearance for the storage clip-retained leveling elements is provided by the offset created by the deployed leveling elements, including the threaded nuts 14, all of which lift and orient the base 16 above the ground surface.

The base 16, which is elevated above the ground, is covered by a decorative cover 17 that is separated by a cover support washer 10 from the base 16 and threadably connects to the upstanding lamp pole lower end 21. The cover coextensively covers the base and provides a decorative shell thereover for the purposes of visual appeal. The lamp pole lower end 21 threadably attaches to the base 16 via a threaded connection, while a flanged washer 18 having extended flanges prevents water from entering the base aperture or from leaking through the decorative cover 17. The upper end 22 of the lamp pole 20 is threadably connected to the lower end 31 of the decorative lamp housing 30, which supports the illumination elements of the present invention. These elements include a translucent light housing 33 and a light source 43 that is powered by a plurality of rechargeable batteries that are charged by the photovoltaic cells that make up the solar energy collection device 41 via wires and a controller board. The solar energy collection device 41, an ambient light sensor 42, the light source 43, a plurality of batteries, a controller board, and other solar lamp elements are stored within the upper lamp enclosure 40 that threadably connect to the upper end 32 of the decorative lamp housing 30. The translucent light housing 33 is positioned within an opening provided by the decorative lamp housing 30, and receives the light source 43 therein.

The uppermost end of the lamp assembly includes the solar energy collection device 41, and an ambient light sensor 42 which are embedded into the upper lamp enclosure 40. The photovoltaic cells serve as the energy collection and power source for the solar lamp. Positioned within the underside of the upper lamp enclosure 40 is a plurality of batteries, a controller board to control the flow of energy, at least one light source 43, and assorted other elements such as wires, clips, and switches that necessary to power the solar lamp. The translucent light housing 33 is contained within the decorative lamp support and protects the elements contained therein including at least one light source 43. The light source 43 may comprises a bulb diffuser that contains one or more lamp bulbs.

The underside of the base 16 is configured with a plurality of downward projecting leveling elements 11. The leveling elements 11 include the pointed ridges 13 and folding feet 12. The folding feet 12 are configured to lift the base 16 above the ground surface to allow air space for effective water flow, proper drainage and airing, and prevention of trapped moisture between the underneath side of the base 16, and to provide gravitationally centered balancing properties of the base 16 and lamp pole 20 on even, uneven, flat, sloping, and hard, soft surfaces.

Figure 2:
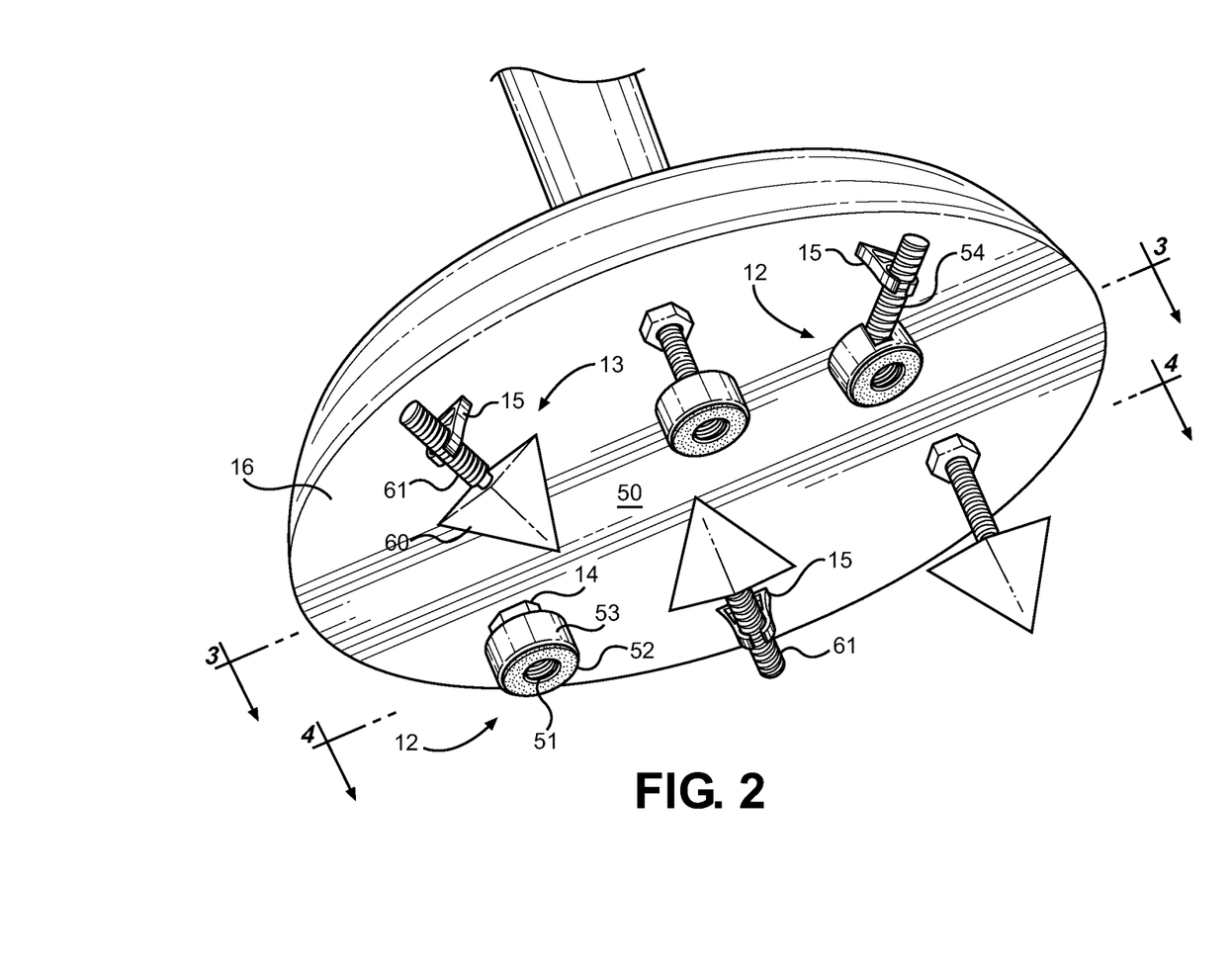
FIG. 2 shows an underside perspective view of the base and the leveling, penetrating, folding, and storage clip elements of the present invention.

Referring now to FIG. 2, there is shown an underside view of the base 16 of the present invention. In this view the decorative cover is not visualized for purposes of clarity. The base 16 comprises a weighted structure that supports the upstanding lamp post and lamp elements. Along the base underside surface 50 of the base are preferably three threaded connections for leveling elements and three threaded connections for downward facing storage clips 15. The three threaded connections for the leveling elements are equidistantly positioned about the base underside surface, both radially and circumferentially about the central post, whereby the folding feet 12, and/or pointed ridges 13 are threadably secured therein and adjust vertically to maintain the desired orientation and offset of the base from the ground surface. Three threaded connections for the storage clips 15 are also positioned radially and circumferentially about the central post and are located in between the three threaded connections for the folding feet 12 and the pointed ridges 13.

The folding feet 12 comprise rounded cylindrical structures having a generally flat and channeled upper surface and a flat lower surface having an underside surface pad 52 thereattached. A threaded member 54 pivotably attaches to the foot structure within its upper surface channel, whereby the threaded member 54 is collapsible into the channel from an upright and deployed state to a folded stowed state such that the storage clips 15 may support the threaded member 54 when stowed. The lower surface of the folding feet 12 includes an underside surface pad 52 that prevents rust stains and other surface stains from developing on the support surface therebelow. Also along the lower surface is a threaded aperture 51, whereby successive leveling elements may be secured together in series. When securing the folding feet 12 to the base 16, a retaining nut 14 tensions the threaded connection between the retaining nut 14 and the threaded apertures of the base to secure the exposed length of the folding foot threaded member in a static position, thereby securing the height of the folding foot at that location.

The second leveling element of the present invention is a pointed ridge 13, which comprises a pointed body 60 that tapers from a first end to a second end having a defined point, whereby a threaded member 61 extends from the pointed body first end. The threaded member 61 is adapted to secure into one of the base threaded apertures (See 91 at FIG. 4) or through the threaded aperture 51 of a deployed folding foot 12. The pointed ridge 13 provides a means to support the base 16 by penetrating soft surfaces such as soil, for which the pointed body 60 is better suited for stable support over the flat folding foot 12. As desired, one pointed ridge 13 may be deployed along with two folding feet 12 wherein the pointed body 60 is fitted into the between-board gap such as is found on decks and balconies, firmly raising, leveling, and steadying the solar lamp.

For those leveling elements not being actively deployed in a vertical position to support the base 16, storage clips 15 are provided along the base underside surface 50 to support and stow the threaded members 61, 54 of either the folding feet 12 or the pointed ridges 13. In this way, the chosen combination of leveling elements is deployed, while those remaining are secured to the base by the storage clips 15. The collapsing structure of the folding feet 12 and the orientation of the pointed ridges 13 allows these un-utilized members to be stowed beneath the base 16 while the deployed leveling elements adjust, support, and level the base above the ground surface with sufficient clearance therefor.

Figure 3:
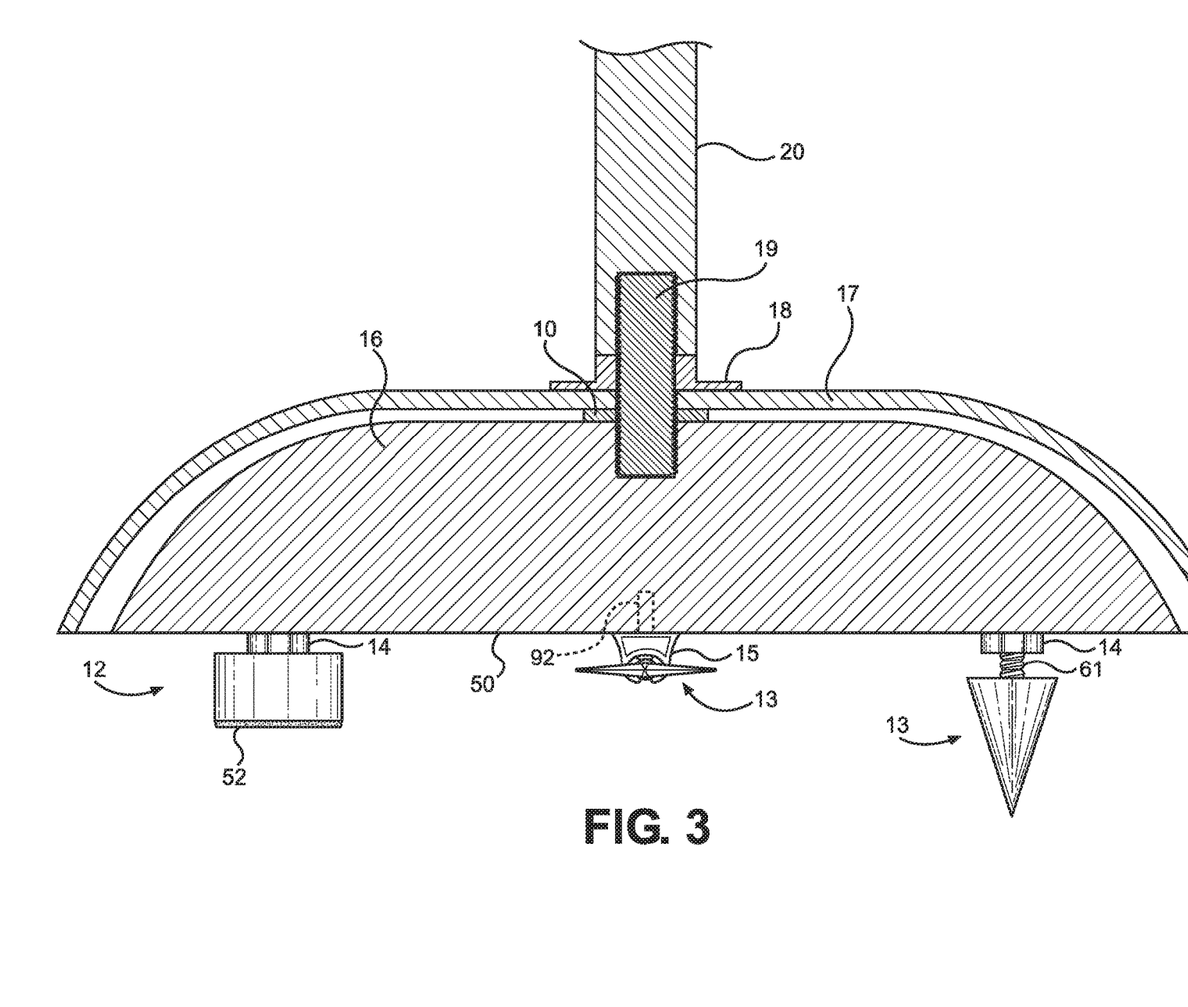
FIG. 3 shows a cross section view of the base of the present invention.

Referring now to FIG. 3, there is shown a cross section view of the base in a working state. An embodiment of the threaded connection 19 between the lamp pole 20 and the base 16 is shown, along with the flanged washer 18, the position of the decorative cover 17 over the base, and the cover support washer 10. The exact layout of the threaded connections between these elements may take several different designs; however it is desired to disclose a means of removable securement between the lamp pole 20 and the base 16, while the decorative cover 17 secures thereover and water is prevented from leaking into the base or through the decorative cover 17 by way of the flanged washer 18.

Figure 4:
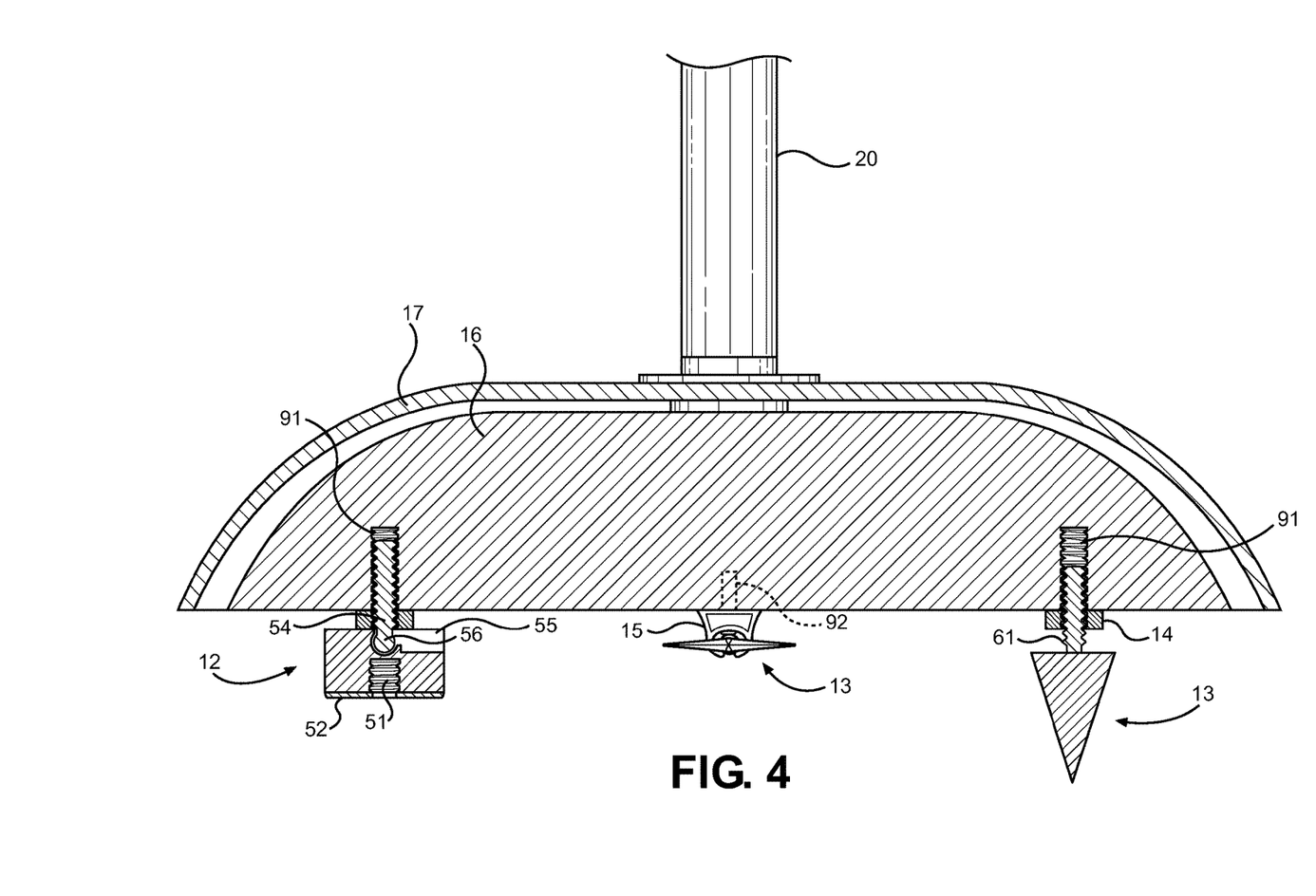
FIG. 4 shows another cross section view of the base of the present invention.

Shown in FIG. 4 there is also a cross section view of the base in working state. The base preferably includes three base threaded apertures 91 that accept leveling elements and three threaded apertures for accepting the clip threaded members, whereby each set of threaded apertures are spread equidistant apart from one another along the base underside surface in a tripod or tri-support configuration. The threaded member 54 of the folding feet 12 or the same threaded member 61 of the pointed ridges 13 is secured within the base threaded apertures 91 and locked into a static position using a retaining nut 14. The pointed ridges 13 can also be threadably attached to a deployed folding foot 12 by way of the threaded aperture 51, which accepts the threaded member 61 of the pointed ridge therein. In this way, the folding foot 12 may rest against a ground surface using its underside surface pad 52, or the folding foot 12 may support a pointed ridge 13 therein. The storage clips 15 secure to the base by way of their own threaded apertures 92, which accept a threaded member or screw fastener from the storage clip 15.

In the preferred embodiment of the base there is also a slight slope from the center of the base to the outer edges to allow for moisture runoff. While this is a preferred structure for the base, it is within the contemplation of the invention that the base and cover may take a wide variety of design configurations such as octagonal or square. Further, the folding feet and pointed ridges can take on many designs such that do not deviate from the utility described herein, wherein functionality across different support surfaces and stability of the base is of primary concern, along with a base-to-surface offset that eliminates the harboring of dirt, mold, mildew or other spotting or stain causing elements. The pointed ridges of the present invention provide a means to anchor the base into soil or to secure the assembly through gaps in an outdoor deck, wherein a pointed ridge may be positioned between two adjacent deck slats for securing the base thereto.

Figure 5:
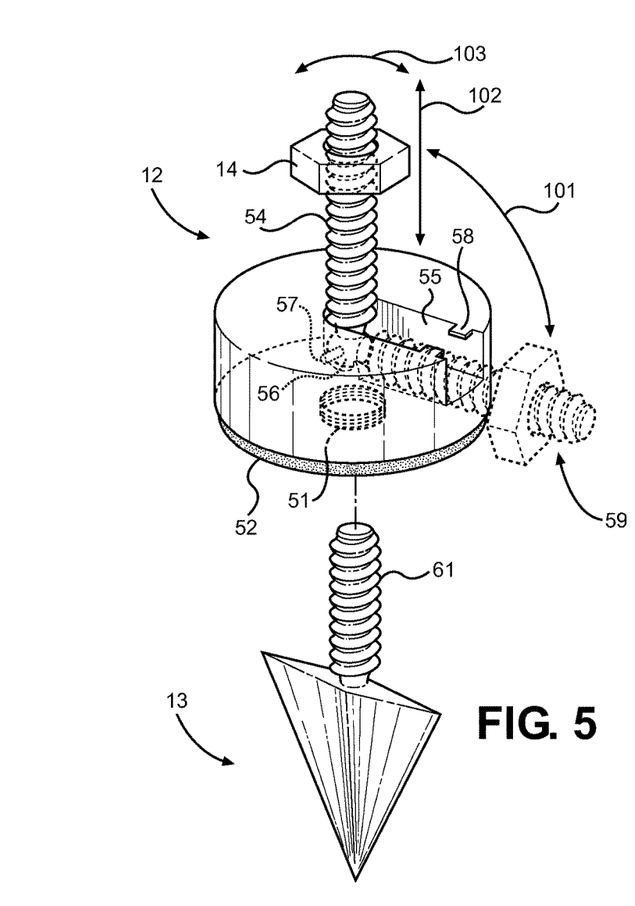
FIG. 5 shows a view of the leveling and storable folding foot.

Referring now to FIG. 5, there is shown a folding foot 12 and its threaded member 54. The folding foot 12 comprises a body structure having a flat upper surface with a channel 55 and a flat lower surface with an underside surface pad 52, along with a flanged 57 ball joint 56 serving as the pivoting connection with for threaded member 54. The threaded member 54 can pivot 101 between an upstanding position and a stowed position 59 within the channel 55. When in a stowed position 59, the threaded member 54 is positioned below the folding foot flat upper surface and is supported by a storage clip 15 below the base, as shown in FIGS. 2 and 3. When stowed, the threaded member is positioned within the channel 55 and within the body of the folding foot, while a pair of tabs 58 along the channel 55 locks the threaded member 54 therein when stowed. The connection between the threaded member 54 and the folding foot body is a pivot joint or revolute joint, allowing the threaded member to pivot in a single plane and about a single axis when transitioning from a deployed to a stowed state. In a preferred embodiment, a flanged 57 ball joint 56 provides a means to rotate the threaded member, while preventing the threaded member 54 from rotating when securing the threaded member 54 into the threaded aperture of the base during deployment. When deployed in an upstanding position, the threaded member extends upwards from its flat upper surface and is utilized to adjust the vertical position 102 of the folding foot body with respect to the base. A retaining nut 14 secures against the base after the folding foot has been threadably rotated 103 into one of the base underside apertures. The underside surface of the folding feet comprises a threaded aperture 51 that accepts the threaded member 61 of a pointed ridge 13, or alternatively the underside surface pad 52 is placed against the ground surface.

Figure 6:
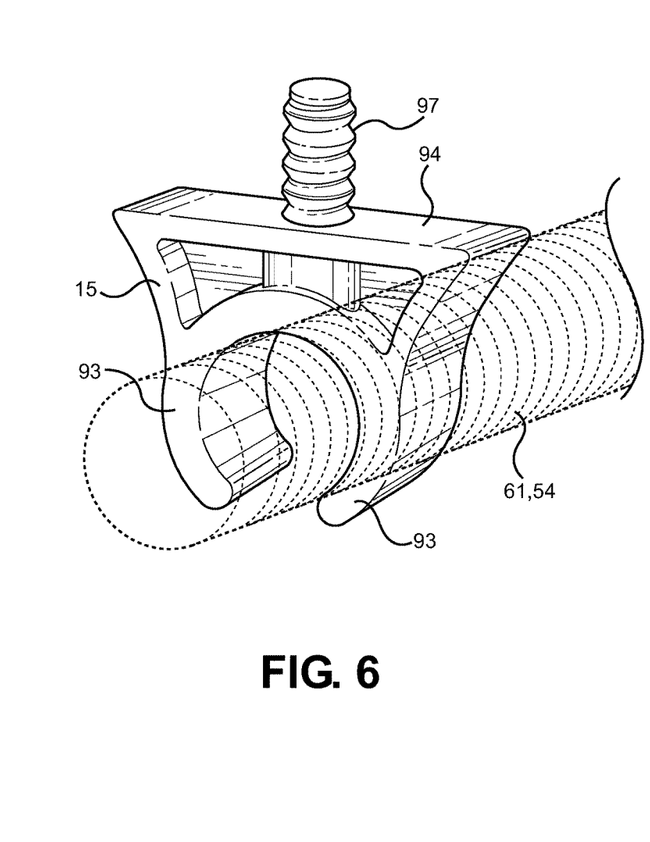
FIG. 6 shows a view of a storage clip along the base underside surface used to retain and support the threaded ends of any un-utilized folding feet and pointed ridges.

Referring now to FIG. 6, there is shown a storage clip 15 of the present invention, three of which are equally interspersed between the base threaded apertures (91, FIG. 4). The storage clip 15 comprises a body that supports a threaded fastener 97 therethrough to connect the storage clip to the base underside surface, along with first and second curved flanges 93 that surround an opening that accepts and secures against the threaded member 61, 54 of one of the leveling elements when not in use. The base 94 of the storage clip is flat to lay flush with the base underside surface and provide minimal offset that would increase its space requirements beneath the base.

Figure 7:
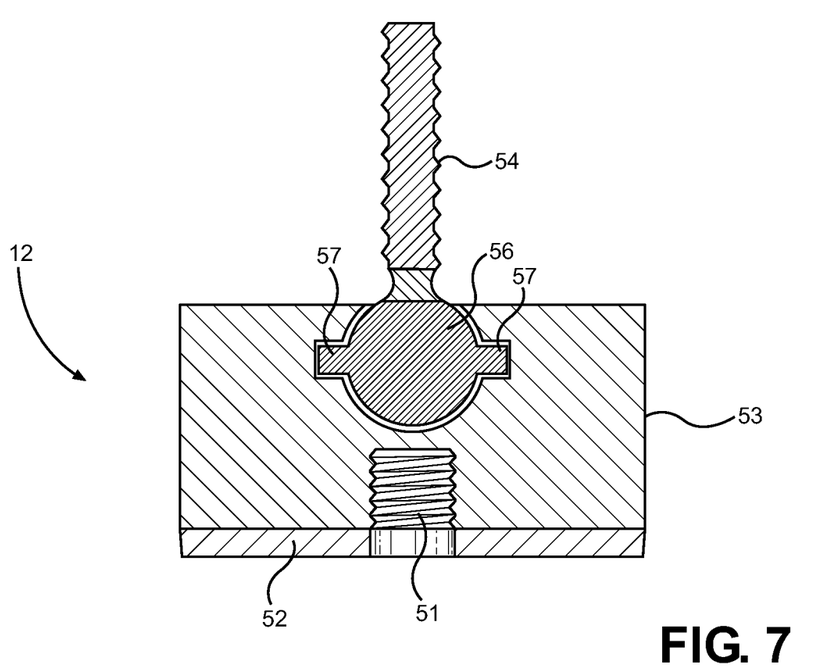
FIG. 7 shows a side cross section view of the folding foot leveling element of the present invention in a deployed state.
Figure 8:
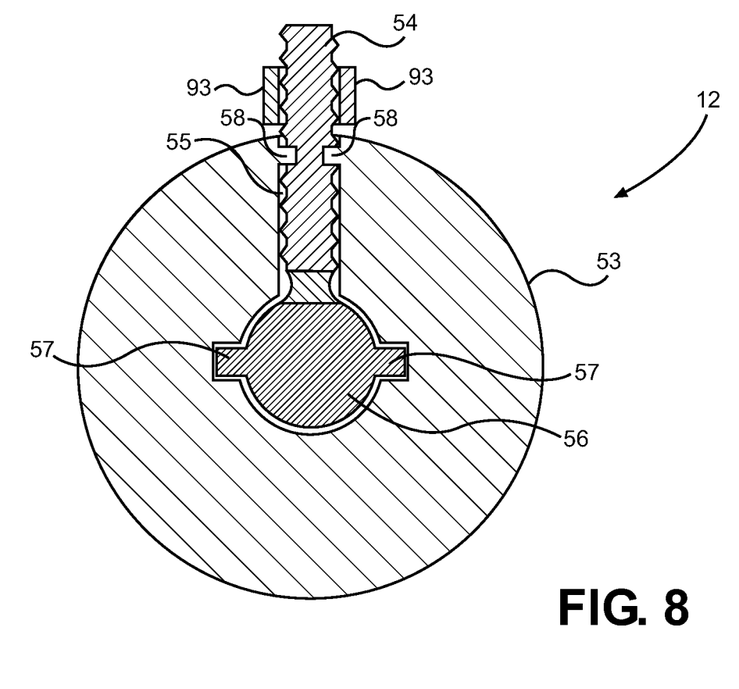
FIG. 8 shows an overhead view of the folding foot leveling element in a stowed state and connected to a storage clip below the base.

Referring now to FIG. 7 and FIG. 8, there are show two cross section cuts of the folding foot 12 leveling element of the present invention, including a vertical section cut (FIG. 7) and a horizontal section cut (FIG. 8) to highlight the novel aspects thereof. The folding foot 12 comprises a body 53 that supports a threaded member 54. The threaded member 54 connects to the body 53 by way of a pivot joint, and preferably using a flanged 57 ball joint 56 such that the threaded member 54 can fold from deployed state (FIG. 7) to a stowed state (FIG. 8) in a single plane while not being free to rotate about its connection. The threaded member 54 engages a threaded aperture of the base on the base underside surface, therefore the threaded member 54 must be prevented from free rotation to allow for the threads of the member 54 to advance into the base aperture. Along the lower surface of the folding foot is an underside surface pad 52 that contours to the given support surface and offsets the body 53 of the folding foot from the ground.

When stowed and as shown in FIG. 8, the threaded member 54 is secured within a channel 55 that extends through the body 53 of the foot and from its ball joint 56 to its outer sidewall. The channel accepts the threaded member 54 when stowed and secures it therein using a pair of tabs 58. A portion of the threaded member extends out of the channel 55, which is grasped by one of the base clips, whereby the curved flanges (shown in FIG. 6, 93) surround the threaded member 54 and support the folding foot 12 along the base underside surface. When stowed, the retaining nut is removed from the threaded member and utilized on a threaded member of a leveling element to be deployed. In this way, a minimum of retaining nuts need be deployed at any given time, their use being only on those leveling elements engaging the threaded apertures of the base while supporting the base.

Figure 9:
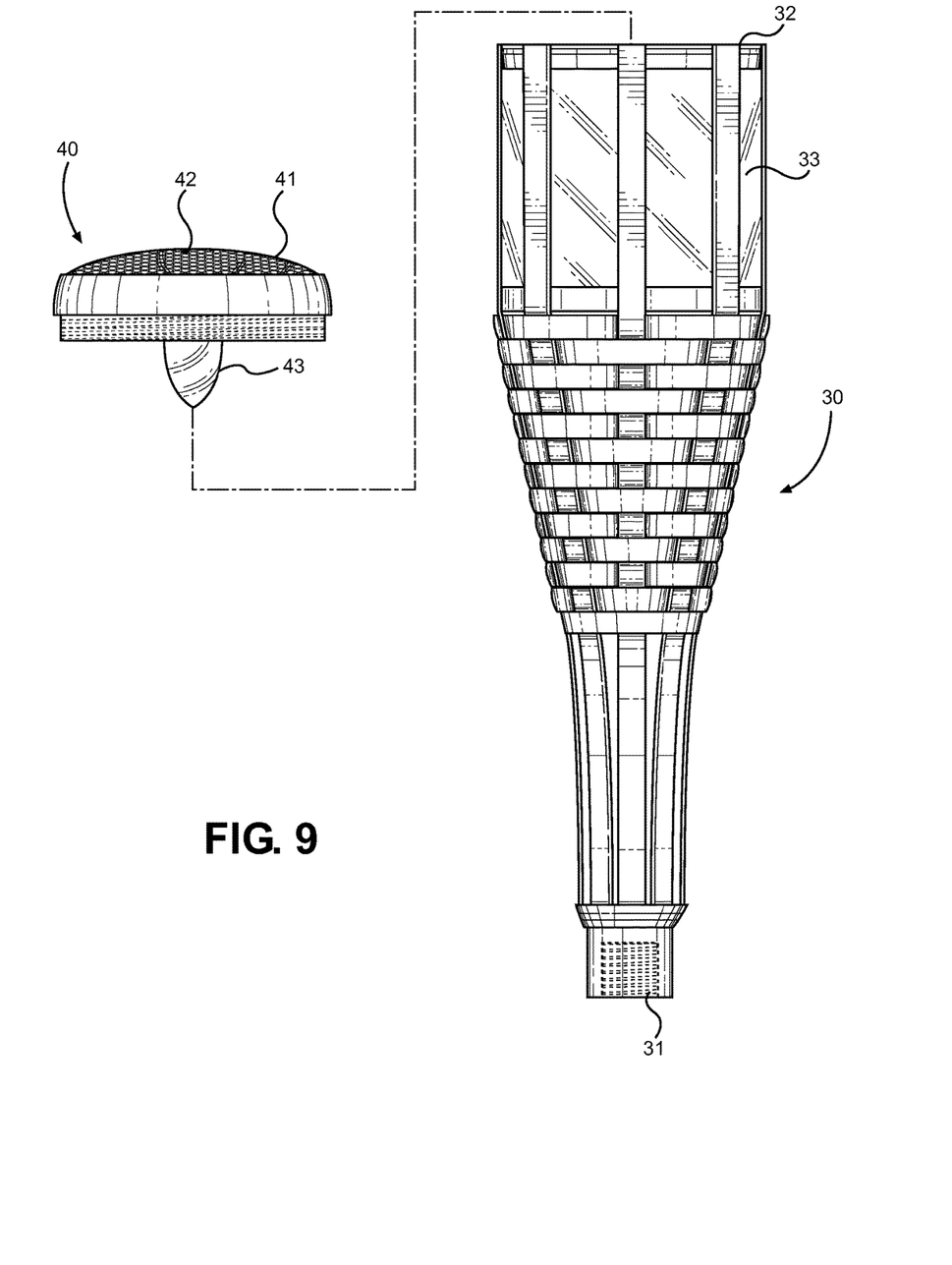
FIG. 9 shows a view of the decorative lamp housing, translucent light housing, and an upper lamp enclosure.

Referring now to FIG. 9, there is a side exploded view of the solar lamp, including its decorative lamp housing 30, the translucent light housing 33, the solar powered elements of the present invention, and the light source 43. An upper lamp enclosure 40 includes a solar energy collection device 41 and ambient light sensor 42, a general area in which other functional apparatus such as a controller panel, clips, batteries, wires and switches can be housed that support the illumination features and energy gathering features of the present invention. Inside the upper lamp enclosure is the light source 43. The lower end 31 of the decorative lamp housing 30 connects to the uppermost end of the upstanding lamp pole, which can be segmented, hollow, solid, and have various designs falling within the scope of the present invention. The upper lamp enclosure 40 secures to the upper end 32 of the decorative lamp support to secure the assembly together in a water tight configuration.

Overall it is desired to disclose a solar floor lamp that includes a leveling capacity, a weighted base, a solar power functionality, and a convenient under-base storage design that allows a user to modularly place the lamp in outdoor spaces without regard to the support surface characteristics. In an embodiment of the present invention, the base can be directly attached decorative lamp housing to create an indoor or outdoor table lamp having a shorter construction (absent a lamp pole). The base as shown enables the outdoor solar lamp to be used on hard surfaces such as balconies, decks, patios, under gazebos, and in or around pools—in addition to uses on predominantly level soft surfaces such as soil, grass or mulch. In the preferred embodiment of the invention, the plurality of downward projecting height-adjustable folding feet and pointed ridges are constructed as three downward projecting pieces of hard material, equidistant from one another to form a tripod arrangement for balance and that screw up or down to provide a balancing means for use on most surfaces.

Materials contemplated for the present assembly include those that can be fabricated from a variety of weather resistant and noncorrosive materials, with some preferred materials being metal such as steel, aluminum, brass and the like, wood, and polymeric materials with fairly high strength engineering such as polycarbonate, and fiber reinforced composites.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. Device leveling elements, comprising:
at least one foot element having a body structure comprising a generally planar upper surface, a generally planar lower surface having an aperture, and a connecting member extending from said generally planar upper surface; and
at least one pointed element having a pointed body, and a connecting member extending therefrom and configured for being removeably received in said aperture of the generally planar lower surface of the body structure of the foot element;
wherein the connecting member of said at least one foot element is configured to adjustably connect to a utilitarian device underside surface for leveling said utilitarian device with respect to a support surface.

2. The device of claim 1 wherein said foot element's connecting member is threaded.

3. The device of claim 1 wherein said foot element's lower surface aperture is threaded and said pointed element connecting member is threaded.

4. The device of claim 3 wherein:
said foot element's connecting member is threaded; and
said utilitarian device is a base.

5. The device of claim 4 further comprising:
said base having an upperside surface and the underside surface;
said base underside surface having at least one threaded aperture configured to receive a corresponding number of leveling elements;
said base upperside surface configured to connect to a pole or other device;
said pole or other device having an uppermost end and a lowermost end;
said base upperside configured to connect to said pole or device lowermost end;
said at least one pointed element is configured to threadably and removeably connect to said base underside surface for offsetting and orienting said pole or other device with respect to a support surface.

6. The device of claim 5 further comprising:
one or more storage clips along said base underside surface for supporting and securing said leveling elements between uses;
one or more retaining nuts for securing said leveling element threaded member connections with said base underside surface.

7. The device of claim 1 wherein:
said connecting member of said at least one pointed element is configured to removeably connect to said utilitarian device underside surface for offsetting and orienting said utilitarian device with respect to a support surface; and
said utilitarian device is a base.

8. The device of claim 7 further comprising:
said base having the lowerside surface and an upperside;
said base underside surface having at least one aperture configured to receive a corresponding number of said leveling elements;
said base upperside surface is configured to connect to a pole or other device;
said pole or other device having an uppermost end and a lowermost end;
said base upperside configured to connect to said pole or other device lowermost end.

9. The device of claim 8 further comprising:
one or more storage clips along said base underside surface for supporting and securing said leveling elements between uses;
one or more retaining nuts for securing said one or more leveling element's connecting member with said base underside surface.

10. The device of claim 1 further comprising:
said foot body structure lower surface having an underside surface pad attached thereto.

11. Device leveling elements, comprising:
at least one folding foot element having a body structure comprising a generally planar upper surface and a generally planar lower surface and a connecting member extending from said folding foot generally planar upper surface;
said connecting member being pivotably joined to said folding foot element's generally planar upper surface and configured to rotate 90 degrees from a completely vertical position to a completely horizontal position with respect to said generally planar upper surface of the at least one folding foot element's body structure;

said at least one folding foot element's connecting member is pivotably joined to said folding foot element's generally planar upper surface by way of a pivotable joint;

said folding foot element's connecting member is configured to rotate between a stowed state and a deployed state within a channel along said folding foot element's generally planar upper surface;

said channel extending through said folding foot element's generally planar upper surface from said pivotable joint to an outer edge of the folding foot element's body structure;

wherein the connecting member of said at least one folding foot element is configured to adjustably connect to a utilitarian device underside surface for leveling said utilitarian device with respect to a support surface.

12. The device of claim 11 wherein:
said at least one folding foot element generally planar lower surface having an aperture;
at least one pointed element having a pointed body and a connecting member extending therefrom and configured for being removeably received in said folding foot's generally planar lower surface aperture.

13. The device of claim 11 further comprising:
said at least one folding foot element generally planar lower surface having an aperture;
said folding foot body structure lower surface having an underside surface pad attached thereto;
said at least one pointed element having a pointed body and a connecting member extending therefrom and configured for being removeably received in said folding foot generally planar lower surface aperture.

14. The device of claim 12 further comprising:
at least one tab for securing said connecting member within said channel when stowed therein.

15. The device of claim 11 wherein:
said folding foot element's connecting member is threaded;
said at least one folding foot element generally planar lower surface having an aperture;
at least one pointed element having a pointed body and a connecting member extending therefrom and configured for being removeably received in said folding foot generally planar lower surface aperture.

16. The device of claim 11 wherein:
said at least one folding foot element's generally planar lower surface having an aperture;
said folding foot element's lower surface aperture and said pointed element's connecting member are threaded;
at least one pointed element having a pointed body and a connecting member extending therefrom and configured for being removeably received in said folding foot generally planar lower surface aperture; and
said utilitarian device is a base.

17. The device of claim 16 wherein said folding foot element's connecting member is threaded.

18. The device of claim 17 further comprising:
said base having the underside surface and an upperside surface;
said base underside surface having at least one threaded aperture configured to receive a corresponding number of leveling elements;
said base upperside surface configured to connect to a pole or other device;
said pole or other device having an uppermost end and a lowermost end;
said base upperside configured to connect to said pole or other device lowermost end;
said at least one pointed element is configured to threadably and removably connect to said base underside surface for offsetting and orienting said pole or other device with respect to a support surface.

19. The device of claim 18 further comprising:
one or more storage clips along said base underside surface for supporting and securing said leveling elements between uses;
one or more retaining nuts for securing said one or more leveling element's connecting member with said base underside surface.

20. The device of claim 11 wherein:
said at least one folding foot element generally planar lower surface having an aperture;
at least one pointed element having a pointed body and a connecting member extending therefrom and configured for being removeably received in said folding foot generally planar lower surface aperture;
said connecting member of said pointed element is configured to removeably connect to said utilitarian device underside surface for offsetting and orienting said utilitarian device with respect to a support surface; and
said utilitarian device is a base.

21. The device of claim 20 further comprising:
said base having the underside surface and an upperside surface;
said base underside surface having at least one aperture configured to receive a corresponding number of said leveling elements;
said base upperside surface configured to connect to a pole or other device;
said pole or other device having an uppermost end and a lowermost end;
said base upperside is configured to connect to said pole or other device lowermost end.

22. The device of claim 21 further comprising:
one or more storage clips along said base underside surface for supporting and securing said leveling elements between uses;
one or more retaining nuts for securing said one or more leveling element's connecting member with said base underside surface.

\* \* \* \* \*